(12) United States Patent
Li et al.

(10) Patent No.: US 9,400,595 B2
(45) Date of Patent: Jul. 26, 2016

(54) UNLOCKING METHOD AND DEVICE FOR TOUCH SCREEN TERMINAL AND TOUCH SCREEN TERMINAL

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Kun Li, Beijing (CN); Zhiqin Zhang, Beijing (CN); Young Yik Ko, Beijing (CN); Feng Bai, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/353,388
(22) PCT Filed: Oct. 30, 2013
(86) PCT No.: PCT/CN2013/086218
§ 371 (c)(1),
(2) Date: Apr. 22, 2014
(87) PCT Pub. No.: WO2014/187079
PCT Pub. Date: Nov. 27, 2014

(65) Prior Publication Data
US 2014/0347302 A1 Nov. 27, 2014

(30) Foreign Application Priority Data
May 24, 2013 (CN) .......................... 2013 1 0199257

(51) Int. Cl.
G06F 3/041 (2006.01)
G06F 3/0484 (2013.01)
(Continued)

(52) U.S. Cl.
CPC ............ *G06F 3/0484* (2013.01); *G06F 1/3262* (2013.01); *G06F 1/3265* (2013.01);
(Continued)

(58) Field of Classification Search
CPC ..... G06F 1/3234; G06F 1/3256; G06F 3/041; G06F 3/0484; G06F 21/36; G09G 2330/00
See application file for complete search history.

(56) References Cited

U.S. PATENT DOCUMENTS 8,363,008 B2 * 1/2013 Ryu et al. ...................... 345/156
8,539,382 B2 * 9/2013 Lyon et al. .................... 715/863
(Continued)

FOREIGN PATENT DOCUMENTS

CN 101702106 A 5/2010
CN 102279710 A 12/2011
(Continued)

OTHER PUBLICATIONS

First Chinese Office Action Appln. No. 201310199257.X; Dated Jul. 1, 2015.
(Continued)

Primary Examiner — Joe H Cheng
(74) Attorney, Agent, or Firm — Ladas & Parry LLP

(57) ABSTRACT

Embodiments of the present invention disclose an unlocking method, a device for touch screen terminal and a touch screen terminal. The method includes: performing a touch unlocking operation to an unlocking unit, wherein the unlocking unit is at least one active area corresponding to the unlocking operation and provided on the touch screen with an area smaller than that of the entire screen; and when the touch screen terminal is in a non-service state, the active area is in a service state or a standing by state; when detecting the touch unlocking operation, generating an unlocking request signal; and providing an unlocking operation interface according to the unlocking request signal. Therefore, the unlocking operation does not depend on a physical key any more, which allows a light and thin profile and a simple and clear appearance, and reduces damage ratio of terminal's components, and at the same time the non-entire screen unlocking operation interface is advantageous for low power consumption requirement on the touch screen.

20 Claims, 2 Drawing Sheets

(51) Int. Cl.
*G06F 3/0488* (2013.01)
*H04M 1/67* (2006.01)
*G06F 1/32* (2006.01)

(52) U.S. Cl.
CPC .............. *G06F 3/041* (2013.01); *G06F 3/0488* (2013.01); *G06F 3/04883* (2013.01); *H04M 1/67* (2013.01); *H04M 2250/22* (2013.01); *Y02B 60/1242* (2013.01); *Y02B 60/32* (2013.01)

(56) References Cited

U.S. PATENT DOCUMENTS

| | | | | |
|---|---|---|---|---|
| 8,712,392 | B2* | 4/2014 | Kim | 455/418 |
| 8,756,511 | B2* | 6/2014 | Heo et al. | 715/741 |
| 8,854,318 | B2* | 10/2014 | Borovsky et al. | 345/173 |
| 8,924,894 | B1* | 12/2014 | Yaksick et al. | 715/863 |
| 2007/0150842 | A1* | 6/2007 | Chaudhri et al. | 715/863 |
| 2008/0278455 | A1* | 11/2008 | Atkins et al. | 345/173 |
| 2009/0006991 | A1* | 1/2009 | Lindberg et al. | 715/763 |
| 2009/0058830 | A1* | 3/2009 | Herz et al. | 345/173 |
| 2009/0083850 | A1* | 3/2009 | Fadell et al. | 726/19 |
| 2009/0264159 | A1* | 10/2009 | Hsieh et al. | 455/566 |
| 2010/0079380 | A1* | 4/2010 | Nurmi | 345/172 |
| 2010/0099394 | A1 | 4/2010 | Hainzl | |
| 2010/0269040 | A1* | 10/2010 | Lee | 715/702 |
| 2011/0294467 | A1* | 12/2011 | Kim et al. | 455/411 |
| 2012/0071149 | A1 | 3/2012 | Bandyopadhyay et al. | |
| 2012/0229406 | A1* | 9/2012 | Wu | G06F 3/04886 345/173 |
| 2012/0233571 | A1* | 9/2012 | Wever et al. | 715/835 |
| 2013/0055169 | A1* | 2/2013 | Wright | H04M 1/67 715/863 |
| 2013/0094770 | A1* | 4/2013 | Lee | G06F 21/36 382/218 |
| 2013/0113723 | A1* | 5/2013 | Chen | G06F 21/30 345/173 |
| 2013/0147733 | A1* | 6/2013 | Lin | G06F 3/041 345/173 |
| 2013/0174067 | A1* | 7/2013 | Zhang | G06F 3/0488 715/764 |
| 2014/0181961 | A1* | 6/2014 | Hsueh | G06F 21/36 726/19 |

FOREIGN PATENT DOCUMENTS

| | | |
|---|---|---|
| CN | 102508591 A | 6/2012 |
| CN | 102622177 A | 8/2012 |
| CN | 102694914 A | 9/2012 |
| CN | 103279300 A | 9/2013 |
| CN | 203241979 U | 10/2013 |

OTHER PUBLICATIONS

International Preliminary Report on Patentability issued Nov. 24, 2015; PCT/CN2013/086218.
Second Chinese Office Action dated Feb. 1, 2016; Appln. No. 201310199257.X.

* cited by examiner

UNLOCKING METHOD AND DEVICE FOR TOUCH SCREEN TERMINAL AND TOUCH SCREEN TERMINAL

This application is a 371 National Stage Entry of PCT International Application PCT/CN2013/086218 filed Oct. 30, 2013, which claims the benefit of foreign priority to the People's Republic of China Patent Application No. 201310199257.X filed on May 24, 2013, the content of which is incorporated herein by reference.

TECHNICAL FIELD

Embodiments of the present invention relate to an unlocking method and a device for touch screen terminal and a touch screen terminal.

BACKGROUND

At present, with the development of electronics and demands of users, touch screen terminals have played dominant roles gradually in electronic products. Since touch screens have a special touch-triggering state, and in order to enhance individual privacy and avoid improper operation on the display screens, most touch screens are provided with screen-locking function. A corresponding unlocking operation is generally initiated by an operation mode of touch screen plus physical key such as unlocking/locking key. A specific operation mode is as follows: first the physical key is pressed to generate a triggering signal for starting up the touch screen; the started touch screen displays an unlocking operation interface providing screen unlocking schemes; and a screen unlocking signal is generated, by the unlocking operation interface by an unlocking operation carried out by a user on the interface, to unlock the touch screen.

It is found in practical applications that controlling starting-up of a touch screen via a physical key (unlocking/locking key) is disadvantageous for realizing a light and thin profile and a simple and clear appearance. In addition, if relying on the physical key, damage to the part will be aggregated and service life of terminal will be shortened. If the physical key (unlocking/locking key) is omitted, it is required that the touch screen has to provide/keep the unlocking operation interface at any moment to enable start-up operation, which would necessarily increase power consumption of the screen and is adverse to energy conservation.

SUMMARY

Embodiments of the present invention provide an unlocking method and device for a touch screen terminal and a touch screen terminal to overcome the defect of relying on a physical key to implement the current unlocking operation, which defect impedes the realization of a light and thin profile and a simple and clear appearance, and overcome the defect of requiring entire screen to stand by and hence increasing power consumption of the screen if the physical key is omitted.

In one aspect, an embodiment of the present invention provides an unlocking method of a touch screen terminal including: performing a touch unlocking operation to an unlocking unit, wherein the unlocking unit is at least one active area corresponding to the unlocking operation and provided on the touch screen with an area smaller than that of the entire screen; and when the touch screen terminal is in a non-service state, the active area is in a service state or a standing by state; upon detecting the touch unlocking operation, generating an unlocking request signal; and providing an unlocking operation interface according to the unlocking request signal.

For example, when the active area is in the service state, the unlocking unit is always in a normally lit-up state in the display screen.

For example, when the active area is in the standing by state, the unlocking unit is in a lit-up and displaying state after being touched.

For example, when there is one active area, the area of the active area is smaller than that of the entire screen.

For example, when there are a plurality of the active areas, the total area of the plurality of the active areas is smaller than that of the entire screen.

For example, the unlocking operation interface is an interface in the active area or an interface of entire screen.

In another aspect, an embodiment of the present invention provides an unlocking device of a touch screen terminal including:

an unlocking unit configured for receiving a touch unlocking operation, wherein the unlocking unit is at least one active area corresponding to the unlocking operation and provided on the touch screen with an area smaller than that of the entire screen; and when the touch screen terminal is in a non-service state, the active area is in a service state or a standing by state;

a detecting unit configured for detecting the touch unlocking operation and when detecting the touch unlocking operation, generating an unlocking request signal and providing the unlocking request signal to a processing unit; and a processing unit configured for providing an unlocking operation interface according to the unlocking request signal.

For example, when the active area is in the service state, the unlocking unit is always in a normally lit-up state in the display screen.

For example, when the active area is in the standing by state, the unlocking unit is in a lit-up and displaying state after being touched.

For example, when there is one active area, the area of the active area is smaller than that of the entire screen.

For example, when there are a plurality of the active areas, the total area of the plurality of the active areas is smaller than that of the entire screen.

For example, the unlocking operation interface is an interface in the active area or an interface of entire screen.

In yet another aspect, an embodiment of the present invention further provides a touch screen terminal including the above-mentioned unlocking device for a touch screen terminal.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 3:
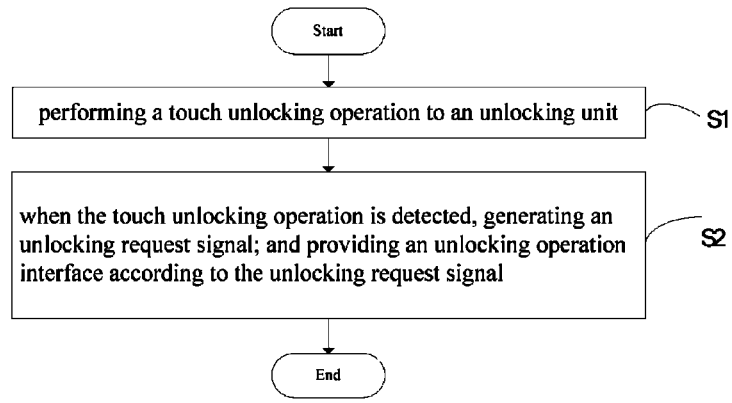
FIG. 3 is a flowing chart of an unlocking method of a touch screen terminal according to the present embodiment.

Referring to FIG. 3, the unlocking method of a touch screen terminal according to the present embodiment may include the following steps:

Step S1: performing a touch unlocking operation to an unlocking unit, wherein the unlocking unit is at least one active area corresponding to the unlocking operation and provided on the touch screen with an area smaller than that of the entire screen; and when the touch screen terminal is in a non-service state, the active area is in a service state or a standing by state.

In this step, the active area is in a service state or a standing by state. The area of the active area is configured to be smaller than that of the entire screen to reduce power consumption of the terminal to the maximum extent. In the service state, the active area can receive input operations by a user at any moment and the unlocking unit in the display screen may be always in a normally lit-up (ON) state and may be input with a touch unlocking operation directly. In the standing by state, the unlocking unit is configured to be in a lit-up and displaying state upon being touched, and thereby can enter the service state and therefore touch unlocking operations may be input within this area.

Step S2: when the touch unlocking operation is detected, generating an unlocking request signal; and providing an unlocking operation interface according to the unlocking request signal.

The unlocking operation interface may be an interface in the active area or an interface in the entire screen. The user may input relevant unlocking schemes according to the unlocking operation interface. The unlocking schemes may be user touch duration, frequency and pattern (such as direction, selection touch for specific icon/area) etc.

The touch unlocking method provided in the embodiment of the present invention makes the unlocking operation not depend on a physical key any longer, which facilitates to realize a light and thin profile and a simple and clear appearance to the maximum extent and decreases the damage ratio of terminal components.

Specifically, in this embodiment, touching the unlocking unit to bring the display screen into the lit-up and displaying state may be realized by a single-point touch or multipoint touch depending on practical requirements in particular. In addition, the touch operation may be a single touch or a plurality of successive touches. In order to avoid touching on display screen due to misoperation and to accurately detect the touching operation on the screen, the screen touching operation may be configured to be dual touches. An active/lit-up and displaying state area is only presented on the screen only if two successive touches on the display screen by the user are detected.

Figure 1:
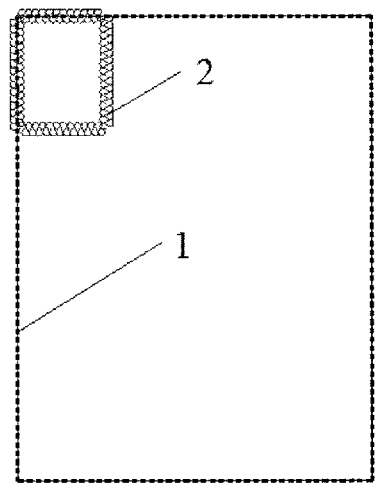
FIG. 1 is a schematic diagram of an individual active area in a touch screen terminal according to an embodiment of the present invention.

In addition, in order to reduce power consumption of the touch screen, there are one or more active areas. When there is one active area, the area of the active area may be smaller than that of the entire screen. When there are a plurality of active areas, the total area of the plurality of active areas may be smaller than that of the entire screen. That is, the area of the unlocking operation interface is not the area of the entire screen, which in turn addresses the low power consumption requirement of the touch screen. Referring to FIG. 1, in applications, the active area 2 occupies only a portion of the screen 1.

The display shape of the active area 2 may be any geometrical pattern such as rectangle, triangle and circle.

Figure 2:
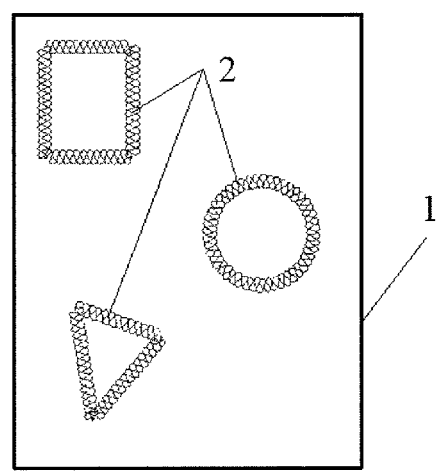
FIG. 2 is a schematic diagram of a plurality of active areas in a touch screen terminal according to an embodiment of the present invention.

When there are a plurality of active areas 2, the plurality of active/lit-up and displaying areas may be of the same or different shapes, as shown in FIG. 2.

The active area(s) may be presented at the predetermined location(s) on the display screen. Specifically, the active areas may be at any locations on the display screen, for example, at the four corners or one side of the screen. In addition, when there are a plurality of active areas, the locations of active areas on the entire touch screen are not fixed. They may be located at one side of the screen, or may be located at edges, surfaces, corners of the screen respectively.

Figure 4:
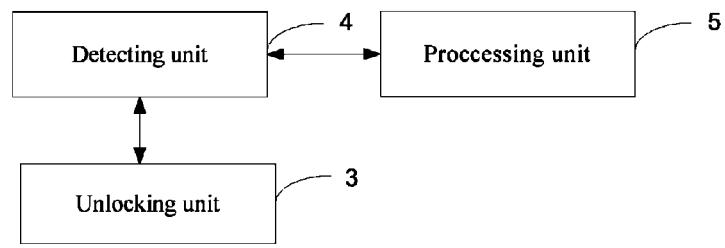
FIG. 4 is a schematic diagram of an unlocking device according to an embodiment of the present invention.

In another aspect, referring to FIG. 4 an embodiment of the present invention further provides an unlocking device including an unlocking unit 3, a detecting unit 4, and a processing unit 5.

The unlocking unit 3 is configured for receiving a touch unlocking operation; the unlocking unit 3 is at least one active area 2 corresponding to the unlocking operation and provided on the touch screen 1 with an area smaller than that of the entire screen; and when the touch screen terminal is in a non-service state, the active area 2 is in a service state or a standing by state;

The detecting unit is configured for detecting the touch unlocking operation and, upon detecting the touch unlocking operation, generating an unlocking request signal and providing the unlocking request signal to a processing unit.

The processing unit is configured for providing an unlocking operation interface according to the unlocking request signal.

For example, when the active area is in the service state, the unlocking unit is always in a normally lit-up state in the display screen.

For example, when the active area is in a standing by state, the unlocking unit is in a lit-up and displaying state upon being touched.

For example, when there is one active area, the area of the active area is smaller than that of the entire screen.

For example, when there are a plurality of active areas, the total area of the plurality of the active areas is smaller than that of the entire screen.

The unlocking operation interface is an interface in the active area or an interface of the entire screen.

In addition to the above-mentioned modules, the unlocking device in the present embodiment may further include other functional modules such as a module for identifying passwords input by a user and unlocking, which may be implemented with any of the conventional technologies and will not be described in detail herein.

In addition, an embodiment of the present invention further provides a touch screen terminal including the above-mentioned unlocking device for a touch screen terminal. The terminal may be for example a smart cellphone, a flat computer or other electronic products.

The unlocking device of a touch screen terminal and a touch screen terminal provided in the embodiments of the present invention make the unlocking operation not depend on the physical key any more, facilitate to realize a light and thin profile and a simple and clear appearance to the maximum extent, and reduce damage ratio of the terminal's components, and at the same time the unlocking operation interface that is not the entire screen is advantageous for low power consumption requirement of the touch screen and saves resources to the maximum extent.

What have been described above are only preferred implementations of the present invention. It should be noted that for those of ordinary skill in the art, various modifications and variations may be made without departing from the technical principles of the present invention, which should also be regarded as the protection scope of the present invention.

The invention claimed is:

1. An unlocking method of a touch screen terminal, comprising:
    performing a touch unlocking operation to an unlocking unit, wherein the unlocking unit is at least one active area corresponding to the unlocking operation and provided on the touch screen with an area smaller than that of the entire screen; and when the touch screen terminal is in a non-service state, the active area is in a service state or a standing by state;
    generating an unlocking request signal upon detecting the touch unlocking operation; and
    providing an unlocking operation interface for the user to input relevant unlocking schemes according to the unlocking request signal.

2. The unlocking method of claim 1, wherein when the active area is in the service state, the unlocking unit is always in a normally lit-up state in the touch screen.

3. The unlocking method of claim 2, wherein the unlocking operation interface is an interface in the active area or an interface of entire screen.

4. The unlocking method of claim 1, wherein when the active area is in the standing by state, the unlocking unit is in a lit-up and displaying state after being touched.

5. The unlocking method of claim 4, wherein when there is one active area, the area of the active area is smaller than that of the entire screen.

6. The unlocking method of claim 4, wherein when there are a plurality of the active areas, the total area of the plurality of the active areas is smaller than that of the entire screen.

7. The unlocking method of claim 4, wherein the unlocking operation interface is an interface in the active area or an interface of entire screen.

8. The unlocking method of claim 1, wherein when there is one active area, the area of the active area is smaller than that of the entire screen.

9. The unlocking method of claim 8, wherein the unlocking operation interface is an interface in the active area or an interface of entire screen.

10. The unlocking method of claim 1, wherein when there are a plurality of the active areas, the total area of the plurality of the active areas is smaller than that of the entire screen.

11. The unlocking method of claim 1, wherein the unlocking operation interface is an interface in the active area or an interface of entire screen.

12. The unlocking method of claim 1, wherein, a location of the active area is adjustable on the display screen.

13. An unlocking device of a touch screen terminal comprising:
    an unlocking unit configured for receiving a touch unlocking operation, wherein the unlocking unit is at least one active area corresponding to the unlocking operation and provided on the touch screen with an area smaller than that of the entire screen; and when the touch screen terminal is in a non-service state the active area is in a service state or a standing by state;
    a detecting unit configured for detecting the touch unlocking operation and, upon detecting the touch unlocking operation, generating an unlocking request signal and providing the unlocking request signal to a processing unit; and
    a processing unit configured for providing an unlocking operation interface for the user to input relevant unlocking schemes according to the unlocking request signal.

14. The unlocking device of claim 13, wherein when the active area is in the service state, the unlocking unit is always in a normally lit-up state in the touch screen.

15. The unlocking device of claim 13, wherein when the active area is in the standing by state, the unlocking unit is in a lit-up and displaying state after being touched.

16. The unlocking device of claim 13, wherein when there is one active area, the area of the active area is smaller than that of the entire screen.

17. The unlocking device of claim 13, wherein when there are a plurality of the active areas, the total area of the plurality of the active areas is smaller than that of the entire screen.

18. The unlocking device of claim 13, wherein the unlocking operation interface is an interface in the active area or an interface of entire screen.

19. A touch screen terminal comprising an unlocking device of a touch screen terminal as described in claim 13.

20. The unlocking device of claim 13, wherein, a location of the active area is adjustable on the display screen.

* * * * *